(12) United States Patent
Tseng et al.

(10) Patent No.: US 10,191,340 B2
(45) Date of Patent: Jan. 29, 2019

(54) DISPLAY DEVICE AND DRIVING METHOD THEREOF

(71) Applicant: AU Optronics Corporation, Hsin-Chu (TW)

(72) Inventors: Sheng-Hsuan Tseng, Hsin-Chu (TW); Chih-Hsien Chi, Hsin-Chu (TW); Ying-Ju Huang, Hsin-Chu (TW); Mei-Hui Lee, Hsin-Chu (TW); Sheng-Shuo Huang, Hsin-Chu (TW); Hung-Che Lin, Hsin-Chu (TW); Sheng-Ju Ho, Hsin-Chu (TW); Yu-Yu Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/431,936

(22) Filed: Feb. 14, 2017

(65) Prior Publication Data

US 2017/0277007 A1   Sep. 28, 2017

(30) Foreign Application Priority Data

Mar. 28, 2016   (TW) .............................. 105109700 A (51) Int. Cl.
*G02F 1/1362*   (2006.01)
*G02F 1/1333*   (2006.01)
*G02F 1/1368*   (2006.01)

(52) U.S. Cl.
CPC .. *G02F 1/136209* (2013.01); *G02F 1/136286* (2013.01); *G02F 2001/136222* (2013.01)

(58) Field of Classification Search
None
See application file for complete search history.

(56) References Cited

U.S. PATENT DOCUMENTS

| 5,879,959 | A | * | 3/1999 | Chen | G02F 1/136209 257/59 |
| 6,268,895 | B1 | * | 7/2001 | Shimada | G02F 1/133512 349/110 |
| 8,334,940 | B2 | | 12/2012 | Tseng et al. | |
| 2001/0046003 | A1 | * | 11/2001 | Song | G02F 1/1309 349/43 |

(Continued)

FOREIGN PATENT DOCUMENTS

| CN | 101526708 A | 9/2009 |
| CN | 103809333 A | 5/2014 |
| TW | I410725 B | 10/2013 |

*Primary Examiner* — Ryan Crockett
(74) *Attorney, Agent, or Firm* — WPAT, PC (57) ABSTRACT

A curved display panel includes a first substrate, a second substrate, a display medium located between the first substrate and the second substrate, scan lines, data lines, pixel structures, color filter patterns, shielding patterns, and filling structures. Each pixel structure is electrically connected to one of the scan lines and one of the data lines, and includes an active device and a pixel electrode. The color filter patterns are disposed corresponding to the pixel structures. The shielding patterns are disposed parallel to the data lines, gaps are provided between the shielding patterns and the scan lines, and the shielding patterns are disposed corresponding to junctions of two adjacent color filter patterns. The filling structures are disposed corresponding to the gaps.

12 Claims, 6 Drawing Sheets

(56) References Cited

U.S. PATENT DOCUMENTS

| | | | |
|---|---|---|---|
| 2006/0017865 A1* | 1/2006 | Tsubata | G02F 1/133512 |
| | | | 349/106 |
| 2006/0033878 A1* | 2/2006 | Sawasaki | G02F 1/133514 |
| | | | 349/158 |
| 2008/0231779 A1 | 9/2008 | Shin et al. | |
| 2010/0002172 A1 | 1/2010 | Kim et al. | |
| 2010/0065849 A1* | 3/2010 | Lee | H01L 27/3244 |
| | | | 257/72 |
| 2012/0105784 A1* | 5/2012 | Ho | G02F 1/136286 |
| | | | 349/139 |
| 2012/0182274 A1* | 7/2012 | Nakahara | G02F 1/136213 |
| | | | 345/204 |
| 2016/0216568 A1* | 7/2016 | Li | G02F 1/134309 |
| 2016/0283001 A1* | 9/2016 | Xu | G02F 1/13338 |
| 2017/0255068 A1* | 9/2017 | Wu | G02F 1/136209 |
| 2017/0351148 A1* | 12/2017 | Yoshida | G02F 1/133753 |

* cited by examiner

DISPLAY DEVICE AND DRIVING METHOD THEREOF

BACKGROUND

Technical Field

The present invention relates to a display panel, and more particularly to a curved display panel.

Related Art

As technologies advance, display technologies also keep developing. Lightweight, thin, short, and small flat panel displays (FPDs) gradually replace conventional thick and heavy cathode ray tube (CRT) displays. Nowadays, because of the characteristics of FPDs being lightweight and thin, the FPDs are arranged on nonplanar surfaces of many buildings or electronic devices. To fit nonplanar surfaces, display panels also need to have particular curvature accordingly, and therefore a curved display panel is also proposed. In a process of the curved display panel, two planar substrates are aligned and assembled and then bent together to form a curved surface. However, after members on the two substrates are bent, the alignment between the two substrates also displaces, causing a light leakage problem in the curved display panel.

SUMMARY

The present invention provides a curved display panel, which can avoid a light leakage problem and has a flat topography.

The present invention provides another curved display panel, which can avoid a light leakage problem and can increase an aperture ratio.

The present invention provides still another curved display panel, which can avoid a light leakage problem and has a flat topography.

The curved display panel of the present invention includes a first substrate, a second substrate, a display medium located between the first substrate and the second substrate, scan lines, a plurality of data lines, a plurality of pixel structures, a plurality of color filter patterns, a plurality of shielding patterns, and a plurality of filling structures. The scan lines and the data lines are located on the first substrate, where the scan lines and the data lines are interlaced with each other. The pixel structures are located on the first substrate, where each pixel structure is electrically connected to one of the scan lines and one of the data lines, and each pixel structure includes an active device and a pixel electrode. The color filter patterns are arranged on the first substrate, where the color filter patterns are disposed corresponding to the pixel structures. The shielding patterns are arranged on the first substrate, where the shielding patterns are disposed parallel to the data lines, gaps are provided between the shielding patterns and the scan lines, and the shielding patterns are disposed corresponding to junctions of two adjacent color filter patterns. The filling structures are arranged on the first substrate, where the filling structures are disposed corresponding to the gaps.

The another curved display panel of the present invention includes a first substrate, a second substrate, a display medium located between the first substrate and the second substrate, a plurality of scan lines, a plurality of data lines, a plurality of pixel structures, a plurality of color filter patterns, a plurality of shielding patterns, and a plurality of standoff strip structures. The scan lines and the data lines are located on the first substrate, where the scan lines and the data lines are interlaced with each other. The pixel structures are located on the first substrate, where each pixel structure is electrically connected to one of the scan lines and one of the data lines, and each pixel structure includes an active device and a pixel electrode. The color filter patterns are arranged on the first substrate, where the color filter patterns are disposed corresponding to the pixel structures. The shielding patterns are arranged on the first substrate, where the shielding patterns are disposed parallel to the data lines, gaps are provided between the shielding patterns and the scan lines, and the shielding patterns are disposed corresponding to junctions of two adjacent color filter patterns. The standoff strip structures are arranged on the first substrate, where the standoff strip structures are disposed parallel to the data lines, and the standoff strip structures are disposed corresponding to the shielding patterns and the gaps.

The still another curved display panel of the present invention includes a first substrate, a second substrate, a display medium located between the first substrate and the second substrate, a plurality of scan lines, a plurality of data lines, a plurality of pixel structures, a plurality of color filter patterns, a plurality of shielding patterns, a plurality of filling structures, and a common electrode. The scan lines and the data lines are located on the first substrate, where the scan lines and the data lines are interlaced with each other. The pixel structures are located on the first substrate, where each pixel structure is electrically connected to one of the scan lines and one of the data lines, and each pixel structure includes an active device and a pixel electrode. The color filter patterns are arranged on the first substrate, where the color filter patterns are disposed corresponding to the pixel structures. The shielding patterns are arranged on the first substrate, where the shielding patterns are disposed parallel to the data lines, and gaps are provided between the shielding patterns and the scan lines. The filling structures are arranged on the first substrate, where the filling structures are disposed corresponding to the gaps. The common electrode is arranged on the second substrate, where an overlapped area between each filling structure and a corresponding scan line is Afg, an overlapped area between each filling structure and a corresponding shielding pattern is Afc, a voltage applied on the corresponding scan line during a non-driving time is Vg, a voltage applied on the corresponding shielding pattern is Vc, a voltage applied on the common electrode is Vcf, and the following expression is met:

$$\{Vg \times Afg/(Afg+Afc) + Vc \times Afc/(Afg+Afc)\} - Vcf < 7 \text{ V}.$$

Based on the above, in the curved display panel of the present invention, shielding patterns and filling structures are included, the shielding patterns are disposed corresponding to junctions of two adjacent color filter patterns, and the filling structures are disposed corresponding to gaps between the shielding patterns and scan lines, so that the curved display panel can avoid a light leakage problem and has a flat topography. In addition, in the another curved display panel of the present invention, shielding patterns and standoff strip structures are included, the shielding patterns are disposed corresponding to two adjacent color filter patterns, and the standoff strip structures are disposed corresponding to the shielding patterns and gaps between the shielding patterns and scan lines, so that the curved display panel can avoid a light leakage problem and can increase an aperture ratio. In addition, in the still another curved display panel of the present invention, filling structures disposed corresponding to gaps between shielding patterns and scan lines are included, and the foregoing expression is met, so that the curved display panel can avoid a light leakage problem and has a flat topography.

To make the foregoing features and advantages of the present invention more comprehensible, detailed description is provided below with reference to the implementation manners and the accompanying drawings.

DETAILED DESCRIPTION

Figure 1:
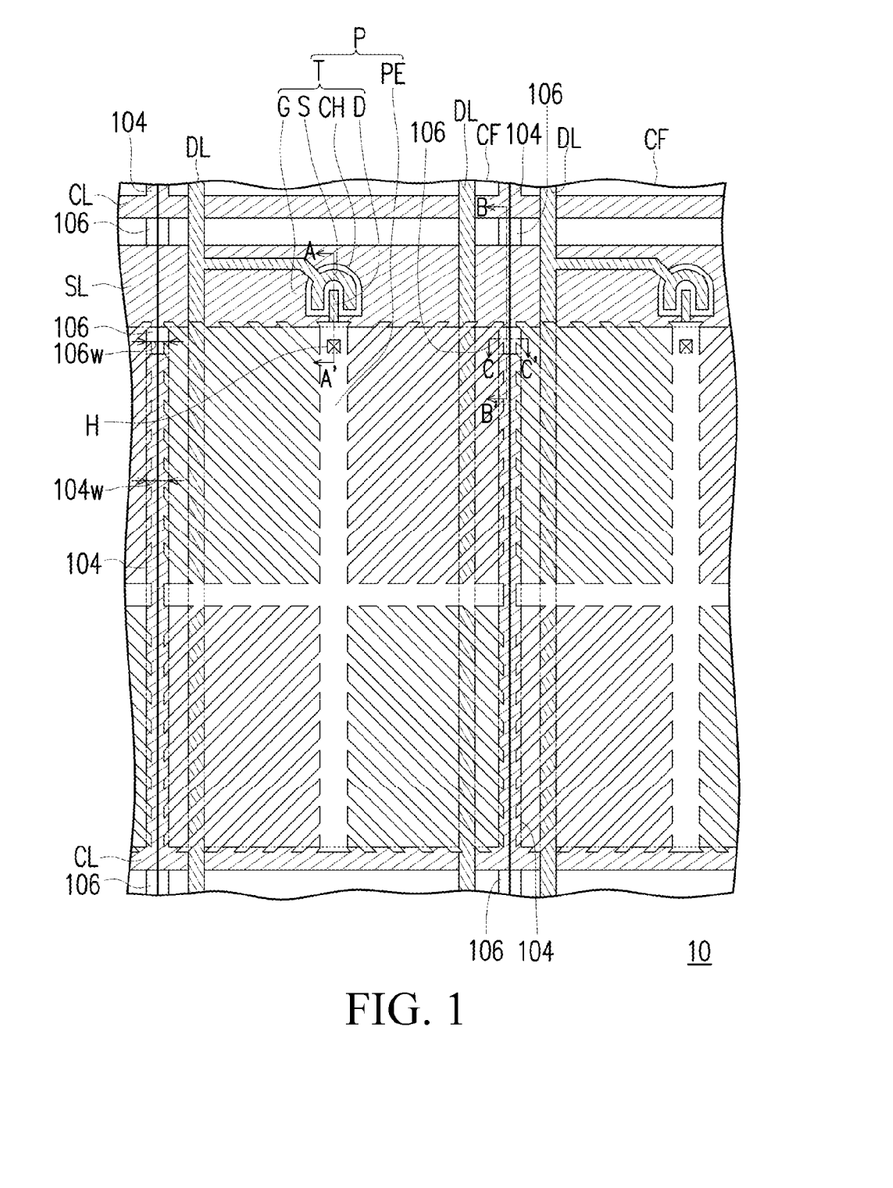
FIG. 1 is a schematic top view of a curved display panel according to an implementation manner of the present invention.
Figure 2:
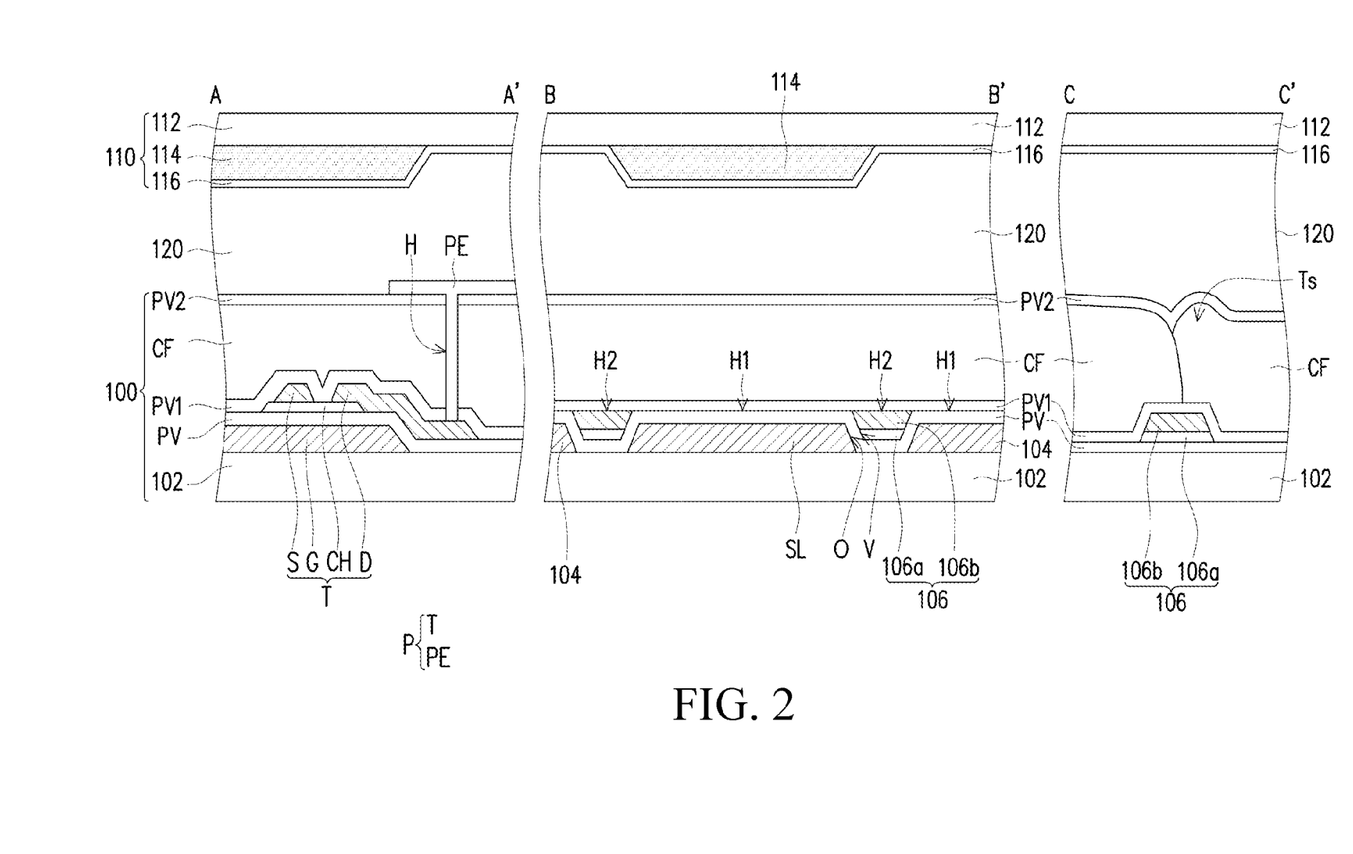
FIG. 2 is schematic sectional views along sectional lines A-A', B-B', and C-C' in FIG. 1.

FIG. 1 is a schematic top view of a curved display panel according to an implementation manner of the present invention, where some film layers are omitted in FIG. 1. FIG. 2 is schematic sectional views along sectional lines A-A', B-B', and C-C' in FIG. 1.

Referring to FIG. 1 and FIG. 2, a curved display panel 10 includes an array substrate 100, an opposite substrate 110, and a display medium 120. Specifically, the array substrate 100 and the opposite substrate 110 are disposed opposite, and the display medium 120 is located between the array substrate 100 and the opposite substrate 110. In this implementation manner, the display medium 120 is, for example, liquid crystal molecules. It should be noted that, to clearly show arrangement relationships of elements in the curved display panel 10, the opposite substrate 110, and the display medium 120 are omitted in FIG. 1.

The array substrate 100 includes a first substrate 102, scan lines SL, data lines DL, pixel structures P, color filter patterns CF, shielding patterns 104, and filling structures 106. In this implementation manner, the array substrate 100 further includes an insulation layer PV, an insulation layer PV1, and an insulation layer PV2. It should be noted that, to clearly show arrangement relationships of elements in the curved display panel 10, the first substrate 102, the insulation layer PV, the insulation layer PV1, and the insulation layer PV2 are omitted in FIG. 1.

The material of the first substrate 102 may be glass, quartz, an organic polymer or a material similar thereto. The scan lines SL and the data lines DL are located on the first substrate 102 and are interlaced with each other; preferably, an extending direction of the scan lines SL is perpendicular to an extending direction of the data lines DL. In this implementation manner, the material of the scan lines SL and the data lines DL is, for example, metal. In addition, the scan lines SL and the data lines DL are located on different film layers, the thickness of the scan lines SL is, for example, 4000 Å to 10000 Å, and the thickness of the data lines DL is, for example, 2800 Å to 5000 Å. In an embodiment, the thickness of the scan lines SL is 5000 Å, and the thickness of the data lines DL is 3300 Å.

The pixel structures P are arranged in an array on the first substrate 102, and each pixel structure P is electrically connected to one of the scan lines SL and one of the data lines DL. Specifically, each pixel structure P includes an active device T and a pixel electrode PE. In this implementation manner, the active device T may be a thin film transistor, which includes a gate G, a channel layer CH, a drain D, and a source S. Specifically, the gate G and the scan lines SL are a continuous conductive pattern, which represents that the gate G is electrically connected to the scan lines SL, and the source S and the data lines DL are a continuous conductive pattern, which represents that the source S is electrically connected to the data lines DL. In other words, when a control signal is input in the scan lines SL, the scan lines SL and the gate G are electrically connected; and when a control signal is input in the data lines DL, the data lines DL and the source S are electrically connected. From another perspective, the gate G and the scan lines SL are a continuous conductive pattern, which represents that the gate G and the scan lines SL are on a same film layer and have a same material; and the source S and the data lines DL are a continuous conductive pattern, which represents that the source S and the data lines DL are on a same film layer and have a same material. In addition, in this implementation manner, the material of the channel layer CH is, for example, an amorphous silicon material, and the thickness of the channel layer CH is, for example, 1300 Å to 2200 Å. In an embodiment, the thickness of the channel layer CH is 1700 Å.

In addition, in this implementation manner, the insulation layer PV is conformally formed on the first substrate 102, and is arranged between the gate G and the channel layer CH, the drain D, and the source S, so as to cover the gate G and act as a gate insulation layer. The material of the insulation layer PV includes an inorganic material (for example, silicon oxide, silicon nitride, silicon nitroxide, another appropriate material, or a stack layer of at least two of the foregoing materials), an organic material or a combination of the above. In addition, in this implementation manner, the active device T is described by using an example of a bottom gate thin film transistor; however, the present invention is not limited thereto. In another implementation manner, the active device T may also be a top gate thin film transistor.

The pixel electrode PE is electrically connected to the active device T. Specifically, the pixel electrode PE is electrically connected to the drain D of the active device T through a contact window H. In this implementation manner, the material of the pixel electrode PE is, for example, a transparent conductive layer, which includes a metal oxide, for example, indium tin oxide (ITO), indium zinc oxide (IZO), aluminum tin oxide (ATO), aluminum zinc oxide (AZO), indium gallium zinc oxide (IGZO), or another appropriate oxide, or a stack layer of at least two of the foregoing. In addition, the pixel electrode PE may be any pixel electrode known to a person of ordinary skill in the art. That is, the pixel electrode PE is not limited to the pozidriv-shaped pattern shown in FIG. 1.

The color filter patterns CF is arranged on the first substrate 102, and is located between the display medium 120 and the pixel structures P and is disposed corresponding to the pixel structures P. Specifically, in this implementation manner, each color filter pattern CF is disposed corresponding to the pixel structures P located on a same column; however, the present invention is not limited thereto. In another implementation manner, each color filter pattern CF may also be disposed corresponding to one pixel structure P. In addition, in this implementation manner, two adjacent color filter patterns CF are overlapped at junctions and produce a bump Ts, as shown in the schematic sectional view along C-C' in FIG. 2. In this implementation manner, the color filter patterns CF include, for example, red, green, and blue filter patterns; however, the present invention is not limited thereto.

The shielding patterns 104 is arranged on the first substrate 102 and is disposed parallel to the data lines DL, and gaps O are provided between the shielding patterns 104 and the scan lines SL. Specifically, in this implementation manner, the shielding patterns 104 is on a same film layer and has a same material as the scan lines SL and the gate G; however, because the gaps O are provided between the shielding patterns 104 and the scan lines SL, the shielding patterns 104 are not electrically connected to the scan lines SL and the gate G. Furthermore, in this implementation manner, the shielding patterns 104 are electrically connected to each other, to form a common electrode line CL connected to a common voltage.

In addition, as discussed above, the insulation layer PV is conformally formed on the first substrate 102 and covers the gate G, and the shielding patterns 104, the gate G, and the scan lines SL belong to a same film layer; therefore, the insulation layer PV similarly also covers the shielding patterns 104 and the scan lines SL, and concave portions V are provided corresponding to the gaps O.

In addition, in this implementation manner, the shielding patterns 104 is disposed corresponding to junctions of two adjacent color filter patterns CF. In other words, in this implementation manner, the two adjacent color filter patterns CF are overlapped on corresponding shielding patterns 104.

The filling structures 106 are arranged on the first substrate 102 and are disposed corresponding to the gaps O. Specifically, in this implementation manner, each filling structure 106 is a multi-layer structure, which includes a first layer 106a and a second layer 106b, where the first layer 106a and the channel layer CH belong to a same film layer. The second layer 106b belongs to a same film layer as the source S, the drain D, and the data lines DL, that is, the first layer 106a and the channel layer CH have a same material. The second layer 106b has a same material as the source S, the drain D, and the data lines DL. In this way, in this implementation manner, the first layer 106a, and the second layer 106b are filled in the concave portions V, corresponding to the gaps O, of the insulation layer PV, so as to fill the concave portions V. Furthermore, in this implementation manner, a top surface H1 of the insulation layer PV and a top surface H2 of the filling structures 106 are coplanar, as shown by the schematic sectional view along B-B' in FIG. 2; however, the present invention is not limited thereto.

In addition, in this implementation manner, the filling structures 106 are similarly disposed corresponding to junctions of two adjacent color filter patterns CF. In other words, in this implementation manner, the two adjacent color filter patterns CF are overlapped on corresponding filling structures 106.

In addition, in this implementation manner, the width 106w of the filling structures 106 is the same as the width 104w of the shielding patterns 104; however, the present invention is not limited thereto. In another implementation manner, the width 106w of the filling structures 106 may be 1 to 0.5 time of the width 104w of the shielding patterns 104.

The insulation layer PV1 is conformally formed on the first substrate 102, and covers the source S and the drain D, so as to provide functions of insulation and protection. The material of the insulation layer PV1 includes an inorganic material (for example, silicon oxide, silicon nitride, silicon nitroxide or a stack layer of at least two of the foregoing materials), an organic material, or a combination of the above, and the material of the insulation layer PV1 may be the same as or different from that of the insulation layer PV.

The insulation layer PV2 is conformally formed on the first substrate 102, and covers the color filter patterns CF, so as to provide functions of insulation and protection. The material of the insulation layer PV2 includes an inorganic material (for example, silicon oxide, silicon nitride, silicon nitroxide or a stack layer of at least two of the foregoing materials), an organic material, or a combination of the above, and the material of the insulation layer PV2 may be the same as or different from those of the insulation layer PV and the insulation layer PV1.

The opposite substrate 110 includes a second substrate 112. In this implementation manner, the opposite substrate 110 further includes an opaque pattern 114 and a common electrode 116.

The material of the second substrate 112 may be glass, quartz, an organic polymer or a material similar thereto. The opaque pattern 114 is located on the second substrate 112, and is used to cover elements and wiring in the curved display panel 10 that are not to be seen by a user. Specifically, in this implementation manner, the opaque pattern 114 is disposed corresponding to the scan lines SL. That is, the opaque pattern 114 is a strip pattern parallel to the scan lines SL and covers the scan lines SL. In addition, in this implementation manner, the material of the opaque pattern 114 includes black resin having an insulation characteristic; however, the present invention is not limited thereto. The opaque pattern 114 may be any opaque pattern known to a person of ordinary skill in the art. For example, the material of the opaque pattern 114 may be opaque metal, and an insulation layer is further included and formed between the opaque pattern 114 and the common electrode 116.

The common electrode 116 is located on the second substrate 112 and covers the opaque pattern 114. The material of the common electrode 116 includes ITO, IZO, ATO, AZO, IGZO, or another appropriate oxide, or a stack layer of at least two of the foregoing.

It should be noted that, as discussed above, in the curved display panel 10, by means of the shielding patterns 104 and the filling structures 106 that are arranged the first substrate 102, where the shielding patterns 104 are disposed corresponding to junctions of two adjacent color filter patterns CF, so that even if a certain degree of alignment displacement exists between the array substrate 100 and the opposite substrate 110, a light leakage phenomenon caused at the junctions where the two adjacent color filter patterns CF are stacked can still be effectively avoided. In this way, the curved display panel 10 can have desirable display quality.

In addition, as discussed above, in the curved display panel 10, the filling structures 106 are disposed in the concave portions V corresponding to the gaps O, and a top surface of the insulation layer PV and a top surface of the filling structures 106 are coplanar, so that the flatness of a topography below junctions of two adjacent color filter patterns CF increases. In this way, in the curved display panel 10, the bump Ts produced because the color filter patterns CF are stacked with each other has reduced variability, so that control complexity of the process is reduced, and a problem of a bubble caused by a stress produced by the bump Ts can be effectively mitigated, so that a yield of the curved display panel 10 is improved.

In addition, as discussed above, because the first layer 106a in the filling structures 106 has a same material as the channel layer CH, and the second layer 106b in the filling structures 106 has a same material as the source S and the drain D, that is, the first layer 106a can be fabricated together with the channel layer CH, and the second layer 106b can be fabricated together with the source S and the drain D. Therefore, fabrication of the curved display panel 10 is compatible with an existing process.

Figure 3:
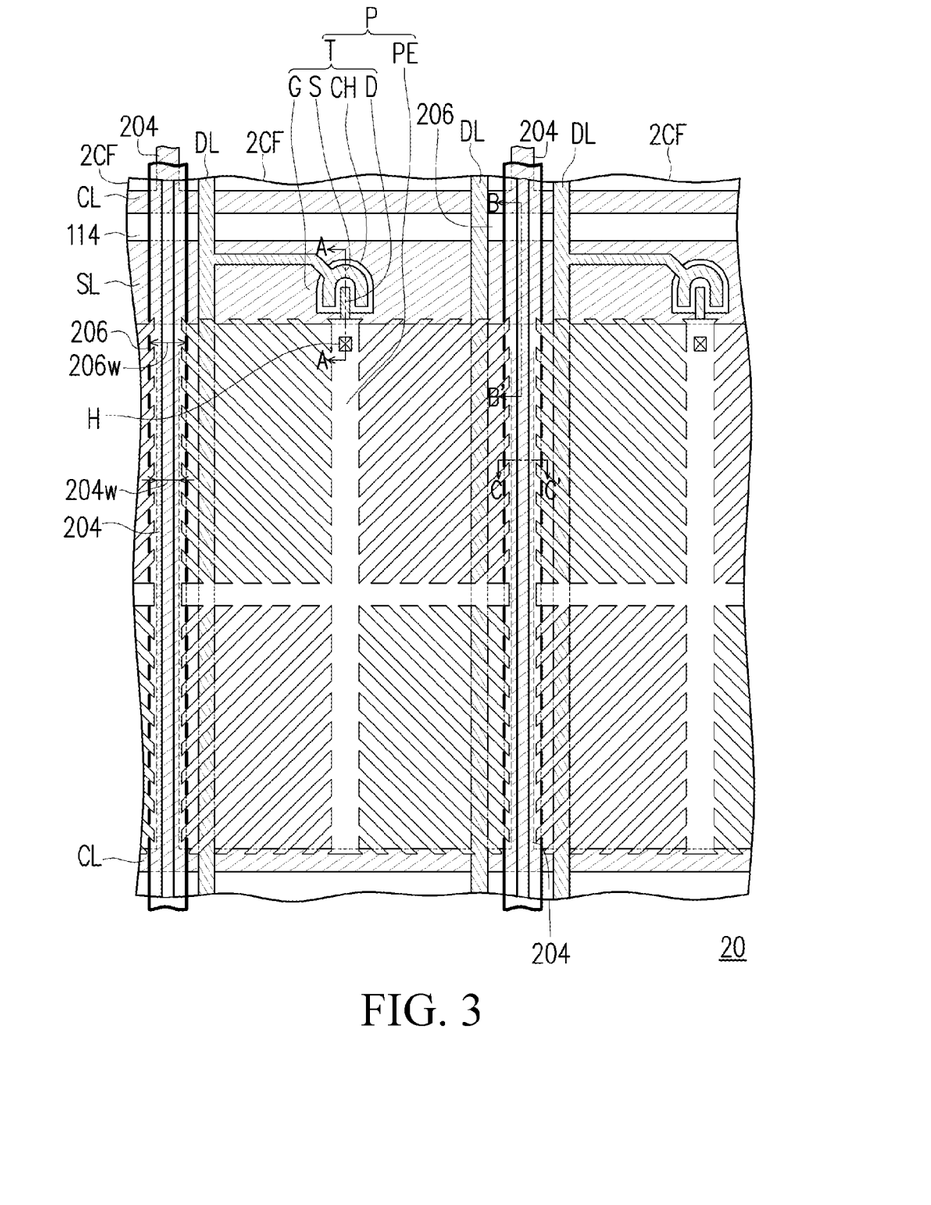
FIG. 3 is a schematic top view of a curved display panel according to another implementation manner of the present invention.
Figure 4:
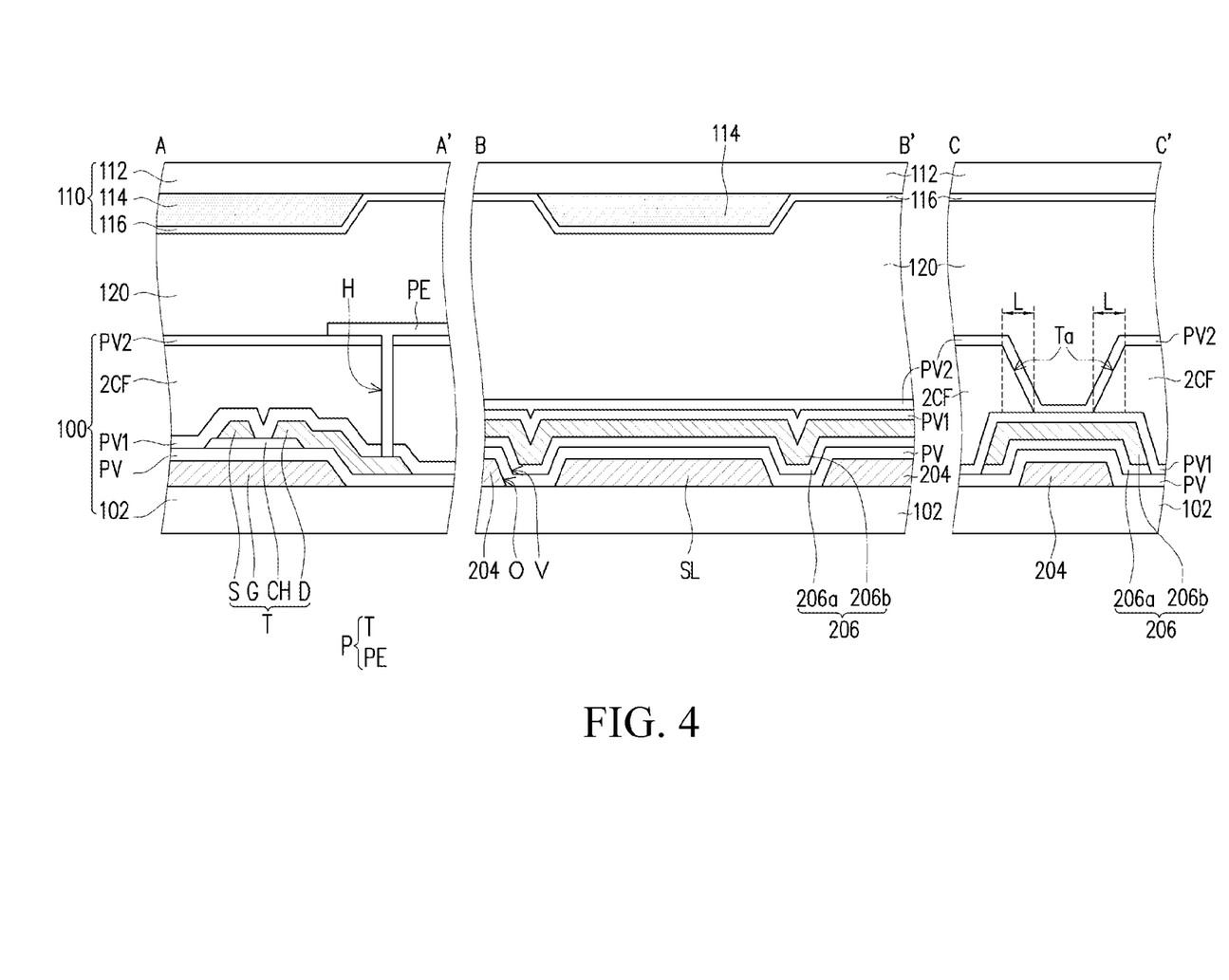
FIG. 4 is schematic sectional views along sectional lines A-A', B-B', and C-C' in FIG. 3.

FIG. 3 is a schematic top view of a curved display panel according to another implementation manner of the present invention. FIG. 4 is schematic sectional views along sectional lines A-A', B-B', and C-C' in FIG. 3. Referring to both FIG. 3 and FIG. 1, a curved display panel 20 in FIG. 3 is similar to the curved display panel 10 in FIG. 1; therefore, similar or different members may be represented by similar or different element symbols, and related description is no longer provided. The differences between the curved display panel 20 and the curved display panel 10 are described below, and for the same parts between the curved display panel 20 and the curved display panel 10, reference may be made to the foregoing description according to the symbols in FIG. 1 and FIG. 2.

Referring to both FIG. 3 and FIG. 4, in this implementation manner, two adjacent color filter patterns 2CF are not overlapped with each other. Specifically, the two adjacent color filter patterns 2CF have a taper Ta parallel to the data lines DL, as shown by the schematic sectional view along C-C' in FIG. 4.

The shielding patterns 204 are disposed corresponding to two adjacent color filter patterns 2CF. Specifically, in this implementation manner, the two adjacent color filter patterns 2CF are not overlapped on corresponding shielding patterns 204, and the two adjacent color filter patterns 2CF are respectively overlapped with the corresponding shielding patterns 204. In other words, in this implementation manner, each shielding pattern 204 is partially not overlapped with a corresponding color filter pattern 2CF.

Standoff strip structures 206 are arranged on the first substrate 102. Specifically, in this implementation manner, the standoff strip structures 206 and the data lines DL are disposed in parallel, and the standoff strip structures 206 are disposed corresponding to the shielding patterns 204 and the gaps O. Further specifically, in this implementation manner, each standoff strip structure 206 is a multi-layer structure, which includes a first layer 206a and a second layer 206b, where the first layer 206a and the channel layer CH belong to a same film layer, and the second layer 206b belongs to a same film layer as the source S, the drain D, and the data lines DL, that is, the first layer 206a and the channel layer CH have a same material, and the second layer 206b belongs to a same film layer as the source S, the drain D, and the data lines DL. In this way, in this implementation manner, the first layer 206a and the second layer 206b are not only filled in the concave portions V, corresponding to the gaps O, of the insulation layer PV, and are further overlapped with the shielding patterns 204.

In addition, in this implementation manner, the standoff strip structures 206 are similarly disposed corresponding to two adjacent color filter patterns 2CF. Specifically, in this implementation manner, the two adjacent color filter patterns 2CF similarly are not overlapped on corresponding standoff strip structures 206. The two adjacent color filter patterns 2CF are similarly overlapped with corresponding standoff strip structures 206 respectively, and each standoff strip structure 206 similarly is partially not overlapped with a corresponding color filter pattern 2CF.

In addition, in this implementation manner, the width 206w of the standoff strip structures 206 is greater than the width 204w of the shielding patterns 204; however, the present invention is not limited thereto. In another implementation manner, the width 206w of the standoff strip structures 206 may be 1 to 0.5 time of the width 204w of the shielding patterns 204.

It should be noted that, as discussed above, in the curved display panel 20, the shielding patterns 204 and the standoff strip structures 206 are arranged on the first substrate 102, where the shielding patterns 204 are disposed corresponding to two adjacent color filter patterns 2CF, so that even if a certain degree of alignment displacement exists between the array substrate 100 and the opposite substrate 110, a light leakage phenomenon caused at the two adjacent color filter patterns 2CF can still be effectively avoided. In this way, the curved display panel 20 can have desirable display quality.

In addition, in the curved display panel 20, the standoff strip structures 206 are disposed corresponding to the shielding patterns 204 and the gaps O, so that as compared with a conventional curved display panel, the taper Ta of the color filter patterns 2CF is formed on a film layer having a relatively large thickness. Therefore, as compared with the conventional curved display panel, the length L of the taper Ta of the color filter patterns 2CF is reduced. In this way, as compared with the conventional curved display panel, an aperture ratio of the curved display panel 20 is increased, and the reason thereof is as follows: As discussed above, because parts of the shielding patterns 204 and the standoff strip structures 206 are not overlapped with the corresponding color filter patterns 2CF, the space that is not formed with the color filter patterns 2CF may be released by using a manner in which the width 204w of the shielding patterns 204 and the width 206w of the standoff strip structures 206 are reduced so that tapers Ta of two adjacent color filter patterns 2CF are closer to each other or in contact with each other; therefore, arrangement locations of the data lines DL can be adjusted according to the released space to increase the aperture ratio. Description is provided below by using an example.

In a conventional curved display panel in which a display size is 50 inches and the width of each subpixel is 95 micrometers, the length of a taper of each color filter pattern is approximately 7 micrometers. In the curved display panel 20 according to an embodiment having a same specification, the length of a taper Ta of each color filter pattern 2CF is approximately 4 micrometers. In this way, for one subpixel, the curved display panel 20 of the embodiment increases the space by a width of approximately 6 micrometers, that is, the curved display panel 20 of the embodiment increases the aperture ratio by approximately $(6/95) \times 100\% = 6.3\%$.

In addition, because two adjacent color filter patterns 2CF are not overlapped with each other, the curved display panel 20 does not have a problem of a bubble caused by a stress from the color filter patterns 2CF, and because the two adjacent color filter patterns 2CF are not overlapped with each other, the curved display panel 20 does not have a bump because the color filter patterns are stacked, so that the curved display panel 20 has desirable process flexibility.

In addition, as discussed above, because the first layer 206a of the standoff strip structures 206 has a same material as the channel layer CH and the second layer 206b of the standoff strip structures 206 has a same material as those of the source S and the drain D, that is, the first layer 206a can be fabricated together with the channel layer CH, and the second layer 206b can be fabricated together with the source S and the drain D. Therefore, fabrication of the curved display panel 20 is compatible with an existing process.

In addition, in the implementation manner of FIG. 3 and FIG. 4, although the standoff strip structures 206 is a multi-layer structure including the first layer 206a and the second layer 206b; however, the present invention is not limited thereto. In another implementation manner, the standoff strip structures 206 may also be a single-layer structure, and the source S and the drain D have a same material.

Figure 5:
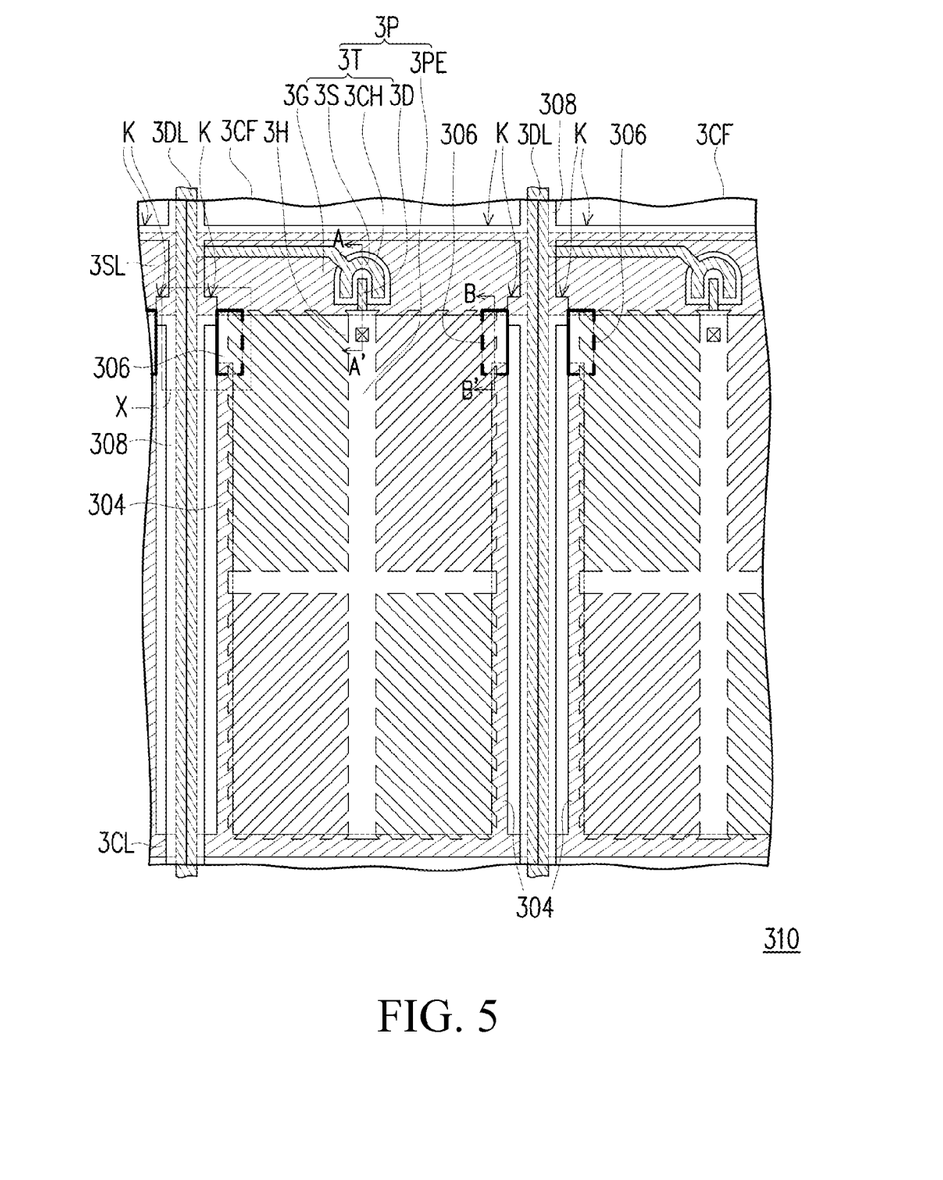
FIG. 5 is a schematic top view of a curved display panel according to still another implementation manner of the present invention.
Figure 6:
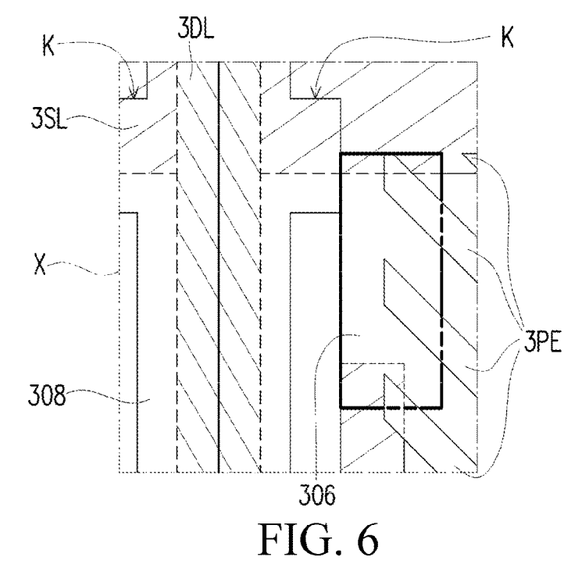
FIG. 6 is a schematic enlarged view of an area X in FIG. 5.
Figure 7:
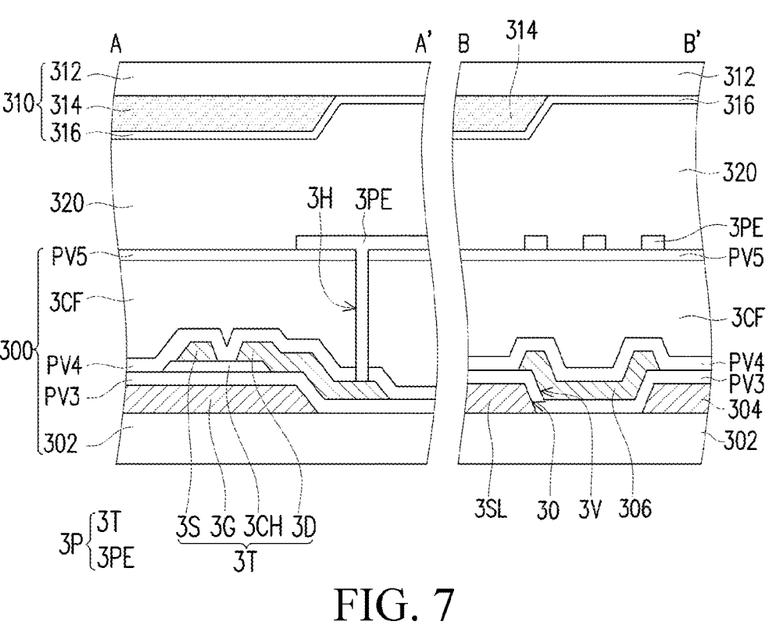
FIG. 7 is schematic sectional views along sectional lines A-A' and B-B' in FIG. 5.

FIG. 5 is a schematic top view of a curved display panel according to still another implementation manner of the present invention. FIG. 6 is a schematic enlarged view of an area X in FIG. 5. FIG. 7 is schematic sectional views along sectional lines A-A' and B-B' in FIG. 5.

Referring to FIG. 5, FIG. 6, and FIG. 7, a curved display panel 30 includes an array substrate 300, an opposite substrate 310, and a display medium 320. Specifically, the array substrate 300 and the opposite substrate 310 are disposed opposite, and the display medium 320 is located between the array substrate 300 and the opposite substrate 310. In this implementation manner, the display medium 320 is, for example, liquid crystal molecules. It should be noted that, to clearly show arrangement relationships of elements in the curved display panel 30, the opposite substrate 310 and the display medium 320 are omitted in FIG. 5.

The array substrate 300 includes a first substrate 302, scan lines 3SL, data lines 3DL, pixel structures 3P, color filter patterns 3CF, shielding patterns 304, and filling structures 306. In this implementation manner, the array substrate 300 further includes conductive patterns 308, an insulation layer PV3, an insulation layer PV4, and an insulation layer PV5. It should be noted that, to clearly show arrangement relationships of elements in the curved display panel 30, the first substrate 302, the insulation layer PV3, the insulation layer PV4, and the insulation layer PV5 are omitted in FIG. 5.

The material of the first substrate 302 may be glass, quartz, an organic polymer or a material similar thereto. The scan lines 3SL and the data lines 3DL are located on the first substrate 302 and are interlaced with each other; preferably, an extending direction of the scan lines 3SL is perpendicular to an extending direction of the data lines 3DL. In this implementation manner, the material of the scan lines 3SL and the data lines 3DL is, for example, metal. In addition, the scan lines 3SL and the data lines 3DL are located on different film layers, the thickness of the scan lines 3SL is, for example, 4000 Å to 10000 Å, and the thickness of the data lines 3DL is, for example, 2800 Å to 5000 Å. In an embodiment, the thickness of the scan lines 3SL is 5000 Å, and the thickness of the data lines 3DL is 3300 Å.

The pixel structures 3P are arranged in an array on the first substrate 302, and each pixel structure 3P is electrically connected to one of the scan lines 3SL and one of the data lines 3DL. Specifically, each pixel structure 3P includes an active device 3T and a pixel electrode 3PE. In this implementation manner, the active device 3T may be a thin film transistor, which includes a gate 3G, a channel layer 3CH, a drain 3D, and a source 3S. Specifically, the gate 3G and the scan lines 3SL are a continuous conductive pattern, which represents that the gate 3G and the scan lines 3SL are electrically connected to each other, and the source 3S and the data lines 3DL are a continuous conductive pattern, which represents that the source 3S and the data lines 3DL are electrically connected to each other. In other words, when a control signal is input in the scan lines 3SL, the scan lines 3SL and the gate 3G are electrically connected; and when a control signal is input in the data lines 3DL, the data lines 3DL are electrically connected to the source 3S. From another perspective, the gate 3G and the scan lines 3SL are a continuous conductive pattern, which represents that the gate 3G and the scan lines 3SL are on a same film layer and have a same material; and the source 3S and the data lines 3DL are a continuous conductive pattern, which represents that the source 3S and the data lines 3DL are on a same film layer and have a same material. In addition, in this implementation manner, the material of the channel layer 3CH is, for example, an amorphous silicon material, and the thickness of the channel layer 3CH is, for example, 1300 Å to 2200 Å. In an embodiment, the thickness of the channel layer CH is 1700 Å.

In addition, in this implementation manner, the insulation layer PV3 is conformally formed on the first substrate 302, and is arranged between the gate 3G and the channel layer 3CH, the drain 3D, and the source 3S, so as to cover the gate 3G and act as a gate insulation layer. The material of the insulation layer PV3 includes an inorganic material (for example, silicon oxide, silicon nitride, silicon nitroxide, another appropriate material, or a stack layer of at least two of the foregoing materials), an organic material or a combination of the above. In addition, in this implementation manner, the active device 3T is described by using an example of a bottom gate thin film transistor; however, the present invention is not limited thereto. In another implementation manner, the active device 3T may also be a top gate thin film transistor.

The pixel electrode 3PE is electrically connected to the active device 3T. Specifically, the pixel electrode 3PE is electrically connected to the drain 3D of the active device 3T through a contact window 3H. In this implementation manner, the material of the pixel electrode 3PE is, for example, a transparent conductive layer, which includes metal oxide, for example, ITO, IZO, ATO, AZO, IGZO, or another appropriate oxide, or is a stack layer of at least two of the foregoing. In addition, the pixel electrode 3PE may be any pixel electrode known to a person of ordinary skill in the art. That is, the pixel electrode 3PE is not limited to the pozidriv-shaped pattern shown in FIG. 5.

The color filter patterns 3CF are arranged on the first substrate 302, and are located between the display medium 320 and the pixel structures 3P and are disposed corresponding to the pixel structures 3P. Specifically, in this implementation manner, each color filter pattern 3CF is disposed corresponding to the pixel structures 3P located on a same column; however, the present invention is not limited thereto. In another implementation manner, each color filter pattern 3CF may also be disposed corresponding to one pixel structure 3P. Further specifically, in this implementation manner, junctions of two adjacent color filter patterns 3CF are disposed corresponding to the data lines 3DL. In other words, in this implementation manner, the two adjacent color filter patterns 3CF are overlapped on corresponding data lines 3DL. In addition, in this implementation manner, the color filter patterns 3CF include, for example, red, green and blue color filter patterns; however, the present invention is not limited thereto.

The shielding patterns 304 are arranged on the first substrate 302 and are disposed parallel to the data lines 3DL, and gaps 3O are provided between the shielding patterns 304 and the scan lines 3SL. Specifically, in this implementation manner, the shielding patterns 304 are on a same film layer and have a same material as the scan lines 3SL and the gate 3G; however, because the gaps 3O are provided between the shielding patterns 304 and the scan lines 3SL, the shielding patterns 304 are not electrically connected to the scan lines 3SL and the gate 3G. In addition, in this implementation manner, on a perpendicular projection surface, the shielding patterns 304 are disposed between the pixel electrode 3PE and the data lines 3DL. In addition, in this implementation manner, the shielding patterns 304 are electrically connected to each other, to form a common electrode line 3CL connected to a common voltage. Specifically, in this implementation manner, the common electrode line 3CL and the pixel electrode 3PE are partially overlapped.

In addition, as discussed above, the insulation layer PV3 is conformally formed on the first substrate 302 and covers the gate 3G, so that the shielding patterns 304, the gate 3G, and the scan lines 3SL belong to a same film layer. Therefore, the insulation layer PV3 similarly also covers the shielding patterns 304 and the scan lines 3SL, and concave portions 3V are provided corresponding to the gaps 3O.

The filling structures 306 are arranged on the first substrate 302, and are disposed corresponding to the gaps 3O. Specifically, in this implementation manner, the filling structures 306 belong to a same film layer and have a same material as the source 3S, the drain 3D, and the data lines 3DL, and the filling structures 306 are overlapped with corresponding shielding patterns 304 and the scan lines 3SL. Further specifically, in this implementation manner, the filling structures 306 extend from an edge of the corresponding concave portions 3V and are filled in the concave portions 3V. In view of this, as compared with a conventional curved display panel in which filling structures are not disposed, in the curved display panel 30, because the filling structures 306 are disposed, the flatness of a topography can be increased.

In addition, in this implementation manner, the filling structures 306 are floating patterns, and therefore, a voltage of the filling structures 306 is susceptible to voltages on the shielding patterns 304 and the scan lines 3SL that are overlapped with the filling structures 306.

The conductive patterns 308 are arranged on the first substrate 302, and the conductive patterns 308 are disposed corresponding to the data lines 3DL. Specifically, in this implementation manner, the conductive patterns 308 are completely overlapped with the corresponding data lines 3DL; however, the present invention is not limited thereto. In another implementation manner, the conductive patterns 308 may also be not completely overlapped with the data lines 3DL. For example, the conductive patterns 308 may be only partially overlapped with a part, interlaced with the scan lines 3SL, of the data lines 3DL. The reason is that the part interlaced with the scan lines 3SL is covered by an opaque pattern (related description is provided below) on the second substrate 312. Therefore, a light leakage problem does not exist even if the conductive patterns 308 are not completely overlapped with this part of the data lines 3DL, and by means of this design, resistance capacitance loading (RC loading) between the conductive patterns 308 and the data lines 3DL can be reduced, thereby improving display quality.

In addition, in this implementation manner, the conductive patterns 308 have a protruding portion K (as shown in FIG. 5 and FIG. 6), and the protruding portion K is located above a boundary area, not covered by the pixel electrode PE and the shielding patterns 304, of the scan lines 3SL. Specifically, the inventor finds that the protruding portion K can provide a shield against an electric field of the scan lines 3SL, so that in a dark state, the curved display panel 30 can avoid a light leakage problem caused by an unexpected twist that occurs when the display medium 320 above the scan lines 3SL is affected by the electric field of the scan lines 3SL.

In addition, in this implementation manner, the conductive patterns 308 and the pixel electrode 3PE belong to a same film layer, and therefore, the conductive patterns 308 and the pixel electrode 3PE have a same material. In addition, in this implementation manner, the conductive patterns 308 are connected to a common voltage connected to the common electrode line 3CL. That is, in this implementation manner, a voltage applied on the conductive patterns 308 is the same as a voltage applied on the common electrode line 3CL.

The insulation layer PV4 is conformally formed on the first substrate 302, and covers the source 3S and the drain 3D, so as to provide functions of insulation and protection. The material of the insulation layer PV4 includes an inorganic material (for example, silicon oxide, silicon nitride, silicon nitroxide or a stack layer of at least two of the foregoing materials), an organic material, or a combination of the above, and the material of the insulation layer PV4 may be the same as or different from that of the insulation layer PV3.

The insulation layer PV5 is conformally formed on the first substrate 302, and covers the color filter patterns 3CF, so as to provide functions of insulation and protection. The material of the insulation layer PV5 includes an inorganic material (for example, silicon oxide, silicon nitride, silicon nitroxide or a stack layer of at least two of the foregoing materials), an organic material, or a combination of the above, and the material of the insulation layer PV5 may be the same as or different from those of the insulation layer PV3 and the insulation layer PV4.

The opposite substrate 310 includes the second substrate 312 and a common electrode 316. In this implementation manner, the opposite substrate 310 further includes an opaque pattern 314.

The material of the second substrate 312 may be glass, quartz, an organic polymer or a material similar thereto. The opaque pattern 314 is located on the second substrate 312, and is used to cover elements and wiring in the curved display panel 30 that are not to be seen by a user. Specifically, in this implementation manner, the opaque pattern 314 is disposed corresponding to the scan lines 3SL. That is, the opaque pattern 314 is a strip pattern parallel to the scan lines 3SL and covers the scan lines 3SL. In addition, in this implementation manner, the material of the opaque pattern 314 includes black resin having an insulation characteristic; however, the present invention is not limited thereto. The opaque pattern 314 may be any opaque pattern known to a person of ordinary skill in the art. For example, the material of the opaque pattern 314 may be opaque metal, and an insulation layer is further included and formed between the opaque pattern 314 and the common electrode 316.

The common electrode 316 is located on the second substrate 312 and covers the opaque pattern 314. The material of the common electrode 316 includes ITO, IZO, ATO, AZO, IGZO, or another appropriate oxide, or a stack layer of at least two of the foregoing.

In addition, in this implementation manner, the common electrode 316 is connected to a common voltage, and when a voltage different from the common voltage is applied on the pixel structures 3P, a perpendicular electric field is generated between the pixel structures 3P and the common electrode 316, so as to drive the display medium 320.

Furthermore, in this implementation manner, the common electrode 316, the conductive patterns 308, and the common electrode line 3CL are all connected to a same common voltage. That is, in this implementation manner, the voltage applied on the common electrode 316, the voltage applied on the conductive patterns 308, and the voltage applied on the common electrode line 3CL are all the same.

It should be noted that, the inventor finds that when the curved display panel 30 meets the following expression: $\{Vg \times Afg/(Afg+Afc)+Vc \times Afc/(Afg+Afc)\}-Vcf<7$ Volt (V), a light leakage phenomenon may not occur in the curved display panel 30 in a dark state, where Afg is an overlapped area between each filling structure 306 and a corresponding scan line 3SL, Afc is an overlapped area between each filling structure 306 and a corresponding shielding pattern 304, Vg is a voltage applied on a corresponding scan line 3SL during a non-driving time, Vc is a voltage applied on a corresponding shielding pattern 304, and Vcf is a voltage applied on the common electrode 316. As discussed above, the voltage of the filling structures 306 is susceptible to the voltage on the shielding patterns 304 and the scan lines 3SL. Therefore, $\{Vg \times Afg/(Afg+Afc)+Vc \times Afc/(Afg+Afc)\}$ is the voltage of the filling structures 306.

Specifically, the inventor finds that in a curved display panel, when a difference value between a voltage on a lead on an array substrate and a voltage on a common electrode on an opposite substrate is greater than 7 V, in a dark state, a bright spot occurs (that is, a light leakage phenomenon occurs) in an area corresponding to an exposed part, not covered by a pixel electrode, of the lead. Based on the foregoing finding, in the curved display panel 30, by means of that a difference value between the voltage of the filling structures 306 and the voltage of the common electrode 316 is less than 7 V (that is, the foregoing expression is met), a light leakage phenomenon does not occur in gaps between the filling structures 306 and the conductive patterns 308 in a dark state.

In addition, as discussed above, the conductive patterns 308 and the data lines 3DL are overlapped, and the voltage applied on the conductive patterns 308 is the same as the voltage applied on the common electrode 316, so that even if a certain degree of alignment displacement exists between the array substrate 300 and the opposite substrate 310, as the conductive patterns 308 are disposed, the curved display panel 30 can still avoid a light leakage phenomenon caused by that a data voltage on the data lines 3DL affects the display medium 320. In another aspect, as discussed above, because the voltage applied on the conductive patterns 308 and the voltage applied on the common electrode line 3CL are both the same as the voltage applied on the common electrode 316, even if gaps are provided between the shielding patterns 304 and the conductive patterns 308, the curved display panel 30 can still avoid a light leakage phenomenon because of a stable electric field.

In addition, as discussed above, because the voltage applied on the common electrode line 3CL is the same as the voltage applied on the common electrode 316, and the shielding patterns 304 are disposed between the pixel electrode 3PE and the data lines 3DL; therefore, the shielding patterns 304 can provide a shield against an electrical impact that is produced on the pixel electrode 3PE when a data voltage is input in the data lines 3DL, so that an electric field of the pixel electrode 3PE is free from interference, thereby improving picture display uniformity and ensuring display quality. In another aspect, because the common electrode line 3CL and the pixel electrode 3PE are partially overlapped, the common electrode line 3CL may be coupled to the pixel electrode 3PE to form a storage capacitor (not shown).

In addition, as discussed above, the conductive patterns 308 have the protruding portion K, the curved display panel 30 can avoid a light leakage phenomenon caused when a scan voltage of the scan lines 3SL affects the display medium 320. The reason is that the voltage applied on the conductive patterns 308 is the same as the voltage applied on the common electrode 316.

As can be seen from the implementation manners in FIG. 5 to FIG. 7, the curved display panel 30 meets the foregoing expression, and the conductive patterns 308 and the opaque pattern 314 are disposed, so that the curved display panel 30 does not have a light leakage problem, and therefore desirable display quality is achieved.

Although the present invention is disclosed as above by using the implementation manners, the implementation manners are not used to limit the present invention. A person of ordinary skill in the art may make various variations and modifications without departing from the spirit and scope of the present invention, and therefore the protection scope of the present invention should be as defined by the appended claims.

What is claimed is:

1. A curved display panel, comprising:
   a first substrate, a second substrate, and a display medium located between the first substrate and the second substrate;
   a plurality of scan lines and data lines, located on the first substrate, wherein the scan lines and the data lines are interlaced with each other;
   a plurality of pixel structures, located on the first substrate, wherein each pixel structure is connected to one of the scan lines and one of the data lines, each pixel structure comprises an active device and a pixel electrode, and each active device comprises a gate, a channel layer, a source, and a drain;
   a plurality of color filter patterns, arranged on the first substrate, wherein the color filter patterns are disposed corresponding to the pixel structures;
   a plurality of shielding patterns, arranged on the first substrate, wherein the shielding patterns are disposed parallel to the data lines, gaps are provided between the shielding patterns and the scan lines, and the shielding patterns are disposed corresponding to junctions of two adjacent color filter patterns; and
   a plurality of filling structures, arranged on the first substrate, wherein the filling structures are disposed corresponding to the gaps, and each filling structure is a multi-layer structure comprising a first layer and a second layer;
   wherein all of the second layer, the source, and the drain comprise a first material, and both the first layer and the channel layer comprise a second material.

2. The curved display panel according to claim 1, further comprising an insulation layer, arranged between the gates and the channel layers, wherein the insulation layer has concave portions corresponding to the gaps, and the filling structures are arranged in the concave portions.

3. The curved display panel according to claim 2, wherein a top surface of the insulation layer and a top surface of the filling structures are coplanar.

4. The curved display panel according to claim 1, wherein the two adjacent color filter patterns are overlapped on corresponding shielding patterns, and the two adjacent color filter patterns are overlapped on corresponding filling structures.

5. A curved display panel, comprising:
a first substrate, a second substrate, and a display medium located between the first substrate and the second substrate;
a plurality of scan lines and data lines, located on the first substrate, wherein the scan lines and the data lines are interlaced with each other;
a plurality of pixel structures, located on the first substrate, wherein each pixel structure is connected to one of the scan lines and one of the data lines, each pixel structure comprises an active device and a pixel electrode, and each active device comprises a gate, a channel layer, a source, and a drain;
a plurality of color filter patterns, arranged on the first substrate, wherein the color filter patterns are disposed corresponding to the pixel structures;
a plurality of shielding patterns, arranged on the first substrate, wherein the shielding patterns are disposed parallel to the data lines, gaps are provided between the shielding patterns and the scan lines, and the shielding patterns are disposed corresponding to two adjacent color filter patterns; and
a plurality of standoff strip structures, arranged on the first substrate, wherein the standoff strip structures are disposed parallel to the data lines, the standoff strip structures are disposed corresponding to the shielding patterns and the gaps, and each standoff strip structure is a single-layer structure;
wherein all of standoff strip structures, the source, and a drain comprise a first material.

6. The curved display panel according to claim 5, further comprising an insulation layer, arranged between gates and channel layers, wherein the insulation layer has concave portions corresponding to the gaps, and the standoff strip structures are filled in the concave portions.

7. The curved display panel according to claim 5, further comprising an insulation layer, arranged between the gates and the channel layers, wherein the insulation layer has concave portions corresponding to the gaps, and the standoff strip structures are filled in the concave portions.

8. The curved display panel according to claim 5, wherein the two adjacent color filter patterns are not overlapped on corresponding shielding patterns, and the two adjacent color filter patterns are not overlapped on corresponding standoff strip structures.

9. A curved display panel, comprising:
a first substrate, a second substrate, and a display medium located between the first substrate and the second substrate;
a plurality of scan lines and data lines, located on the first substrate, wherein the scan lines and the data lines are interlaced with each other;
a plurality of pixel structures, located on the first substrate, wherein each pixel structure is connected to one of the scan lines and one of the data lines, and each pixel structure comprises an active device and a pixel electrode;
a plurality of color filter patterns, arranged on the first substrate, wherein the color filter patterns are disposed corresponding to the pixel structures;
a plurality of shielding patterns, arranged on the first substrate, wherein the shielding patterns are disposed parallel to the data lines, and gaps are provided between the shielding patterns and the scan lines;
a plurality of filling structures, arranged on the first substrate, wherein the filling structures are disposed corresponding to the gaps; and
a common electrode, arranged on the second substrate, wherein each filling structure and a corresponding scan line are overlapped at Afg, each filling structure and a corresponding shielding pattern are overlapped at Afc, a voltage Vg is applied on the corresponding scan line during a non-driving time, a voltage Vc is applied on the corresponding shielding pattern, a voltage Vcf is applied on the common electrode, and a difference value between the voltage of the filling structure and the voltage of the common electrode is less than 7V as expressed in the following expression:

$$\{Vg \times Afg/(Afg+Afc)+Vc \times Afc/(Afg+Afc)\}-Vcf<7 \text{ V};$$

wherein the active device comprises a gate, a channel layer, a source, and a drain, wherein all of the filling structures, the source, and the drain comprises a first material.

10. The curved display panel according to claim 9, further comprising conductive patterns, arranged on the first substrate, wherein the conductive patterns are disposed corresponding to the data lines.

11. The curved display panel according to claim 10, wherein the conductive patterns have a same material as the pixel electrode.

12. The curved display panel according to claim 10, wherein a voltage applied on the conductive patterns is the same as a voltage applied on the common electrode.

* * * * *